No. 741,601. PATENTED OCT. 13, 1903.
A. W. WHITFIELD.
NUT LOCK.
APPLICATION FILED MAR. 21, 1903.
NO MODEL.
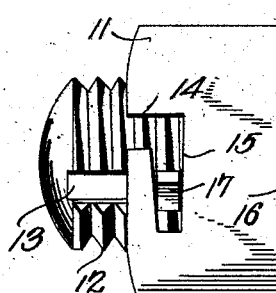
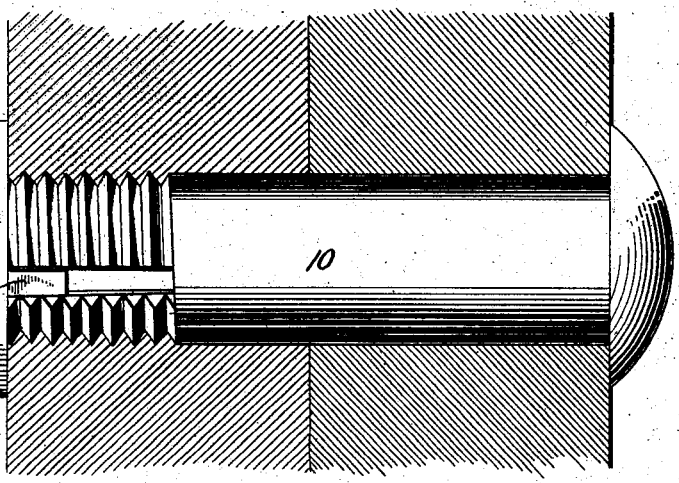
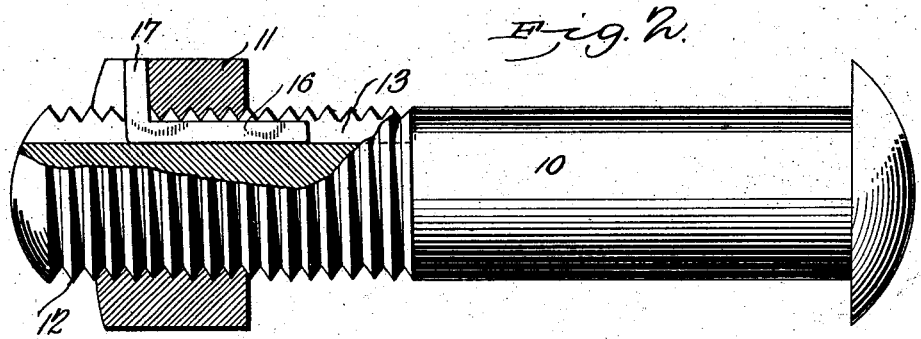
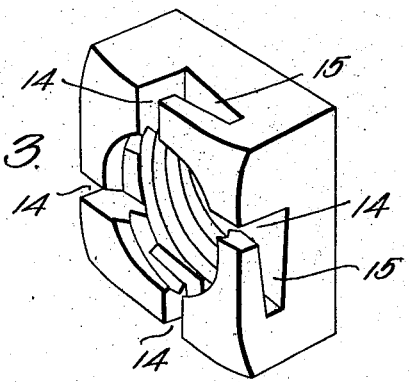
Witnesses
E. F. Stewart
C. N. Woodward
A. W. Whitfield, Inventor.
by C. A. Snow & Co.
Attorneys No. 741,601. Patented October 13, 1903.

UNITED STATES PATENT OFFICE.

ALFRED W. WHITFIELD, OF LATTY, OHIO.

NUT-LOCK.

SPECIFICATION forming part of Letters Patent No. 741,601, dated October 13, 1903.

Application filed March 21, 1903. Serial No. 148,988. (No model.)

*To all whom it may concern:*

Be it known that I, ALFRED W. WHITFIELD, a citizen of the United States, residing at Latty, in the county of Paulding and State of Ohio, have invented a new and useful Nut-Lock, of which the following is a specification.

This invention relates to devices for preventing nuts turning backwardly from the bolts, and has for its object to simplify and improve devices of this character; and the invention consists in certain novel features of construction, as hereinafter shown and described, and specified in the claims.

In the drawings illustrative of the invention, in which corresponding parts are denoted by like designating characters, Figure 1 is a view of a bolt and nut with the improved locking means applied. Fig. 2 is a similar view with the parts partially in section. Fig. 3 is a perspective view of the nut detached. Fig. 4 is a perspective view of the key-plug detached.

The improved device may be applied to any form or size of nut, but for the purpose of illustration is shown applied to an ordinary bolt 10 and an ordinary square nut 11. Formed transversely of the threads 12 of the bolt is a channel or groove 13, sunken below the roots of the threads, as shown.

The nut 11 is provided with one or more radial slots 14, extending partially through the nut longitudinally and entirely through it from the threaded aperture outward to the periphery of the nut. Each of the slots 14 is extended laterally at its inner end, as at 15, the extensions preferably formed with inclined sides converging toward the inner end of said lateral extension. The slots 14 extend about one-third the thickness of the nut and do not weaken them materially, and if found necessary, where greater strength is required, the nuts may be made thicker than ordinary, so that the presence of the slots will not reduce the strength.

Adapted for insertion into the channel or keyway 13 is a key-plug 16, having a laterally-extended "head" 17 and adapted to be forced into the channel between the threads of the nut and the body of the bolt with the head 17 disposed opposite the lateral extension 15 of the slot in position so that a slight backward turning of the nut will firmly lock it to the bolt and its backward rotation efficiently resisted. When the key-plug has been driven "home" and a slight backward turn of the nut has moved the lateral extension 15 of the slot over the head 17, the wedge shape of the extension tightly compresses the head and holds the key-plug firmly in position and effectually prevents its removal, obviating any tendency of the nut to work loose, no matter how severely the jarring to which it is subjected.

It will be noted that the "grip" of key-plug is exerted entirely within the solid or unmutilated portion of the nut and not opposite the slotted portions or the relatively weaker portions opposite the slots. Hence the full strength of the unmutilated portions of nuts is utilized and the desired results produced without detracting from the efficiency of the nut.

By using a plurality of the L-shaped slots it will be obvious that it will not be necessary to rotate the nut more than a fraction of a revolution to bring the channel 13 into proper position relative to one of the slots; but while the employment of the plurality of slots is an advantage, generally speaking, I do not wish to be limited to any specific number of the slots and reserve the right to employ one or more, as circumstances may require.

Having thus described the invention, what I claim is—

1. The combination with a bolt having a channel extending transversely of its screw-threads, of a nut having a radial slot extending from its threaded aperture to the periphery thereof, said slot having a lateral extension at its inner end, the walls of said lateral extension converging toward the inner end thereof to form a wedge-shaped opening, and a key adapted to engage said channel and having a laterally-extended head to engage the walls of the wedge-shaped lateral extension of said slot.

2. The combination with a bolt having an angular channel extending transversely of its screw-threads, of a nut having a radial slot extending from its threaded aperture to the periphery thereof, said slot having a lateral extension at its inner end, and a key angular in cross-section adapted to fit and slide in said angular channel between the nut and the body of the bolt and having a head for engaging the walls of the lateral extension of said slot.

In testimony that I claim the foregoing as my own I have hereto affixed my signature in the presence of two witnesses.

ALFRED W. WHITFIELD.

Witnesses:
E. P. SHAEFFER,
M. L. SWICK.